United States Patent [19]
Shinohara et al.

[11] Patent Number: 5,851,062
[45] Date of Patent: Dec. 22, 1998

[54] PRISM SHEET FOR SURFACE LIGHT SOURCE

[75] Inventors: Masayuki Shinohara; Yutato Okuno; Shigeru Aoyama, all of Kyoto, Japan

[73] Assignee: Omron Corporation, Kyoto, Japan

[21] Appl. No.: 694,695

[22] Filed: Aug. 9, 1996

[30] Foreign Application Priority Data

Aug. 11, 1995 [JP] Japan .................................. 7-227296

[51] Int. Cl.$^6$ ...................................................... F21V 5/02
[52] U.S. Cl. ................... 362/31; 362/26; 362/339
[58] Field of Search ............................. 362/26, 31, 330, 362/328, 329, 339, 331

[56] References Cited

U.S. PATENT DOCUMENTS

| | | | |
|---|---|---|---|
| 5,414,599 | 5/1995 | Kaneko et al. ............................ | 362/31 |
| 5,467,208 | 11/1995 | Kokawa et al. ........................... | 362/31 |
| 5,467,417 | 11/1995 | Nakamura et al. . | |
| 5,572,411 | 11/1996 | Watai et al. .............................. | 362/31 |
| 5,579,134 | 11/1996 | Lengyel .................................... | 362/31 |
| 5,600,455 | 2/1997 | Ishikawa et al. ......................... | 362/31 |

*Primary Examiner*—Thomas M. Sember
*Attorney, Agent, or Firm*—Foley & Lardner

[57] ABSTRACT

A periodic pattern is formed on a surface of prism sheet, and the cross section of a minimal unit 14 of the periodic pattern is shaped like an M. The M-shape includes a long positive-sloping surface, a short negative-sloping surface, a short positive-sloping surface and a long negative-sloping surface 16b. By designing the prism sheet in such a manner, a portion of the light behaving in a side mode is converted to recurrent mode light, and the surface luminance is enhanced.

10 Claims, 15 Drawing Sheets

SIDE MODE

FRONT MODE

RECURRENT MODE

FIGURE 15(a)
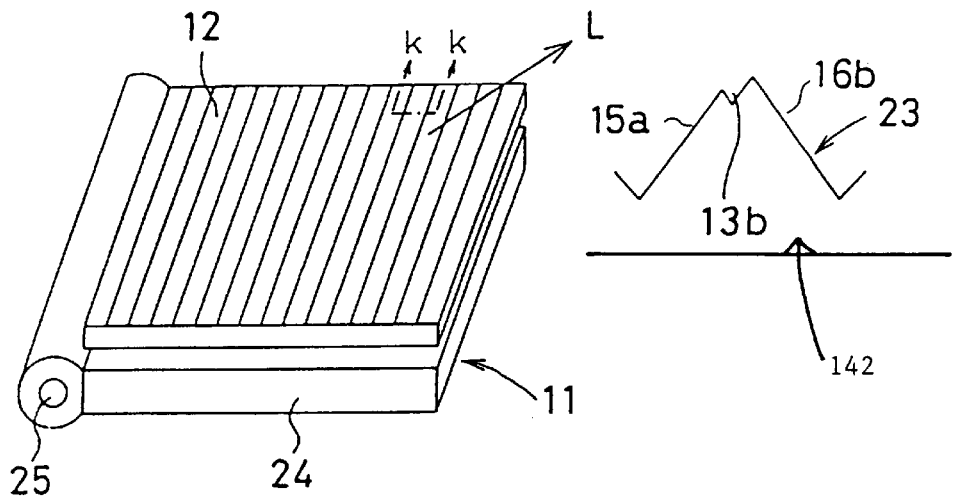
FIGURE 15(b)
FIGURE 16(a)
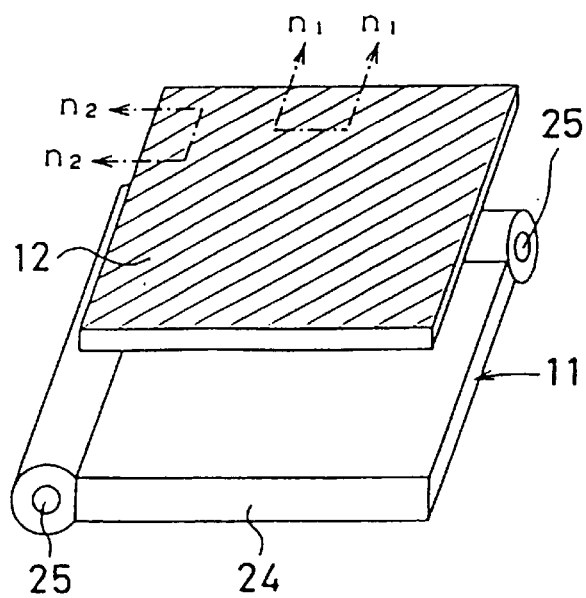
FIGURE 16(b)
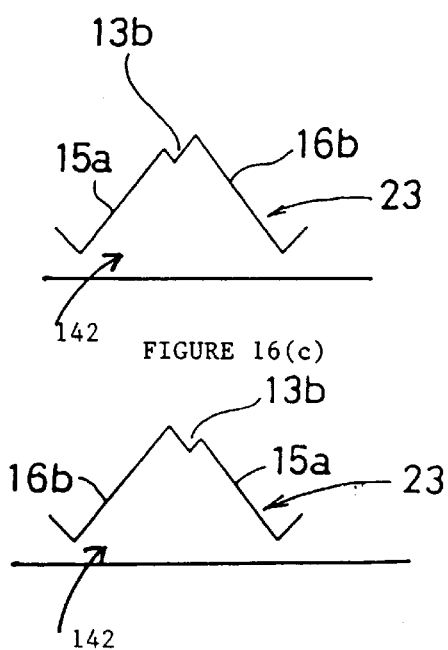
FIGURE 16(c)

PRISM SHEET FOR SURFACE LIGHT SOURCE

FIELD OF THE INVENTION

This invention relates to a prism sheet for a surface light source which increases the luminance by reducing the amount of light beams that are emitted outside of a desired field of view. The surface of the prism sheet is designed so as to condense the incoming light efficiently. This kind of surface light source can be used for surface-type optical elements (for example, an LCD) which are widely employed for use as an image display, a display screen for a computer display, a data terminal, a TV receiver, a video camera and a head-mounting display.

BACKGROUND OF THE INVENTION

Liquid crystal display (LCD) panels have the characteristics of being thin and light-weight. Because of these qualities, they have come to be widely used in recent years for such applications as notebook or book-type personal computers, display screens for portable TVs, displays for portable terminal devices and terminal equipment for display purposes.

However, as liquid crystal display panels are not themselves capable of emitting light, a separate surface light source must be provided for the display. Since most portable devices such as notebook-type personal computers or appliances like portable TVs are battery-driven, there is a demand for a long battery life. This leads to a preference for efficient use of photoemissive power.

FIG. 1 is an exploded perspective view of a conventional surface light source A, which is used with a liquid crystal display panel. Surface light source A has a diffusion panel 2 and a prism sheet 3 above a photoconductive panel 1, and a reflective sheet 4 below the panel 1. On the side of panel 1 is a linear light source 5, which is shown as a fluorescent lamp. Prism sheet 3 has a periodic pattern which is repeated uniformly in one direction and runs perpendicular to that direction. The minimal unit of this periodic pattern is a triangular prism 6 with two surfaces. Generally, the cross section of the prism 6 is an isosceles triangle with base angles of 45° or 40°, and these triangles are arrayed in a single dimension. To produce a uniform intensity of reflected light, a pattern is formed on the surface of reflective sheet 4 which includes portions which reflect directly and other portions which reflect diffusely, both arranged at an appropriate density pattern.

The light produced by linear light source 5 is conducted from the lateral surface of photoconductive panel 1 to its interior and reflected upward by reflective sheet 4. The light emitted from the upper surface of conductive panel 1 is diffused at a uniform brightness by diffusion panel 2. Prisms 6 of prism sheet 3 condense the light diffused by panel 2 to increase its luminance.

The prism sheet 3 provided in surface light source A as described above reduces horizontal leakage by condensing the light and thereby enhances the efficiency with which the light is used. To ascertain the effect of prism sheet 3, the angular dependency (the directional characteristic) of the luminance with and without prism sheet 3 was measured. The result is shown in FIG. 2. If the horizontal axis $\Theta_x$ represents direction Z, the direction of radiation with respect to the upper surface of prism sheet 3, and the X axis represents the direction in which the periodic pattern is arrayed, then the angle measured is the one formed by the Z axis at surface Z-X (the angle is positive in the positive direction of the X axis) (See FIG. 1). The vertical axis represents relative luminance. Broken line b represents the angular dependency of the relative luminance (of the light conducted by conductive panel 1) when prism sheet 3 is not used, and solid line a represents the angular dependency of the relative luminance (of the light which exits prism sheet 3) when prism sheet 3 is used.

As is made clear by FIG. 2, prism sheet 3 condenses the light which exits conductive panel 1 into a comparatively narrow range (in the example shown in FIG. 2, from −45° to +45°). Since most of the systems which use a liquid crystal display are for personal use, the angles of view which are most frequently employed will fall in the range of ±30° to ±45°. Installing a prism sheet 3 in surface light source A causes the light outside the field of view to be channeled into it, thereby increasing the luminance on the front of the liquid crystal display panel. This is precisely why prism sheets 3 are used in surface light sources A.

However, when the solid line a in FIG. 2 is looked at in detail, it is apparent that it has a secondary peak p on either end (at approximately ±75°). Even when a prism sheet 3 is used in surface light source A, then, a great deal of the light travels outside of the targeted angle of view. The light emitted beyond this angle of view is wasted.

If the behavior of a light beam 7 which strikes an existing prism sheet 3 is analyzed, one finds that it can be divided into three modes of behavior of light rays according to the angle of incidence. These are shown in FIGS. 3 ($a$), 3 ($b$), 3 ($c$), 3 ($d$) and 3 ($e$). FIG. 3 ($a$) shows the luminance (i.e., the directional characteristic) for each optical path of the light which passes through diffusion panel 2, as expressed by Lambert's law. The beams which pass through diffusion panel 2 and strike prism sheet 3 exhibit three modes of behavior: a front mode, a recurrent mode and a side mode.

In the front mode, which is shown in FIG. 3 ($c$), beams which enter prisms 6 from below strike the oblique surfaces of those prisms at an angle of incidence which is smaller than the angle of total internal reflection. They are refracted and emitted to the exterior via the oblique surfaces of prisms 6. The front mode is the mode for which prism sheet 3 is designed. The majority of the beams 7 which pass through prism sheet 3 exhibit front mode behavior. In this mode, as can be seen in FIG. 3 ($c$), the spreading of the beams transmitted by prisms 6 is checked, and a directional characteristic can be achieved such that the luminance is high at the front (see FIG. 3 ($e$)).

In the recurrent mode, as shown in FIG. 3 ($d$), the beams 7 which enter prisms 6 are reflected twice by the oblique surfaces of those prisms, re-emitted via the lower surface of prisms 6 and returned to conductive panel 1. The beams 7 which return are reflected by panel 1 at luminance k (due to scattering and other losses, k=0.9, typically) and returned once again to prism sheet 3. Most of these recycled beams 7 are converted to front mode beams which strike prisms 6.

In the side mode, as shown in FIG. 3 ($b$), the beams 7 which enter prisms 6 are reflected by one of the oblique surfaces of the prism and refracted by the opposite oblique surface as they are transmitted to the exterior. Since the path of the beams 7 emitted in the side mode is approximately 90° off the normal path (i.e., $\Theta_x$=approximately ±90°), they are effectively useless. The two peaks p in solid line a shown in FIG. 2 represent the beams travelling in side mode.

Of the three modes of behavior, then, the side mode is the most crucial in improving the function of the prism sheet. If the number of beams which exhibit side mode behavior can be reduced, then the number of beams which exit the prism at a large angle can be minimized, thereby increasing the frontal luminance.

SUMMARY OF THE INVENTION

This invention is developed in consideration of the technical background discussed above. Its objective is to reduce the number of beams which exit a prism sheet covering a surface light source in a side mode so as to improve the frontal luminance.

The prism sheet of a surface light source described in this invention is distinguished by the following. It comprises a surface which has a periodic pattern consisting of regularly repeated angled edges like M-shaped pattern. A cross section of one of the minimal units of the periodic pattern characterizing this prism sheet has at least four surface slopes, each of which has a slope which is opposite the next.

In this prism sheet, the minimal unit of the periodic pattern has at least four surface slopes which are arranged in such a way that each surface slops faces opposite the next. That is, surface slopes with positive and negative slopes vis-à-vis the surface direction of the prism sheet are arranged to each other. The central two surface slopes out of four are shorter than the other two, and these two shorter slopes constitute a shallow groove in each periodic pattern. Thus, a portion of the beam which is reflected by one surface and transmitted by another surface will reenter the prism sheet via the third surface and be reflected by the fourth surface opposite the third surface. In this way, the beam will be made to assume a recurrent mode.

BRIEF DESCRIPTION OF THE DRAWINGS

FIG. 6 (b) illustrates how front mode light behaves with respect to a conventional prism sheet.

FIG. 7 (b) illustrates how recurrent mode light behaves with respect to a conventional art prism sheet.

FIG. 8 (b) illustrates how side mode light behaves with respect to a conventional prism sheet.

FIG. 14 (b) is provided for comparison to FIG. 14 (a).

FIG. 15 (a) is a perspective drawing of a surface light source covered with a prism sheet which is another ideal embodiment of this invention.

FIG. 15 (b) is an enlarged cross section taken along line k—k in (a).

FIG. 16 (a) is a perspective drawing of a surface light source covered with a prism sheet which is another ideal embodiment of this invention.

FIG. 16 (b) is an enlarged cross section taken along line $n_1$—$n_1$ in (a). (c) is an enlarged cross section taken along line $n_2$—$n_2$ in (a).

FIGS. 18 (b) through (d) illustrate the shape of the continuous pattern in different locations on the prism sheet.

DETAILED DESCRIPTION OF THE INVENTION

Figure 4:
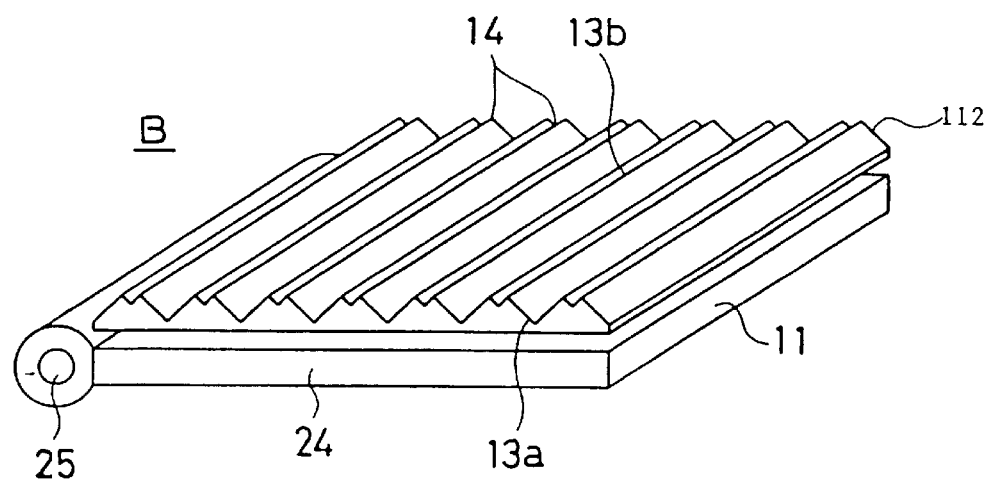
FIG. 4 is a perspective drawing of a surface light source covered with a prism sheet designed according to this invention.

FIG. 4 shows a surface light source B covered with a prism sheet, according to a first embodiment of this invention. Surface light source B includes backlight unit (light source) 11 and surface-type prism sheet 112. A diffusion panel may be placed between backlight unit 11 and prism sheet 112, or a diffusion panel or sheet may be provided on the surface of the light source to diffuse the light. Another alternative would be to diffuse the light with a diffusion panel or sheet on the undersurface of prism sheet 112. Backlight unit 11 emits light toward its upper surface, on which prism sheet 112 is placed.

The upper surface of prism sheet 112 includes deep V-shaped grooves 13a and shallow V-shaped grooves 13b, which alternate with respect to each other. The M-shaped portion between each pair of deep grooves 13a is an M-shaped prism 14, the minimal unit of the periodic pattern. The periodic pattern of prism sheet 112, then, extends uniformly along the Y axis and includes a repeated series of the M-shaped prisms 14 which are its minimal units along the X axis. Minimal units 14 include a long surface slope 15a, which has a positive slope (for the purpose of explanation, inclinations which go up toward the right in the drawing are referred to as positive, and those which go down toward the right are referred to as negative); a short surface slope 16a, which has a negative slope; a short surface slope 15b, which has a positive slope; and a long surface slope 16b, which has a negative slope (See FIG. 5). It is not necessary that 15a and 15b, the surface slopes with positive slopes, and 16a and 16b, the surface slopes with negative slopes, have exactly the same slope. If they do, however, it will be easier to design the shape of the periodic pattern for prism sheet 112.

Figure 1:
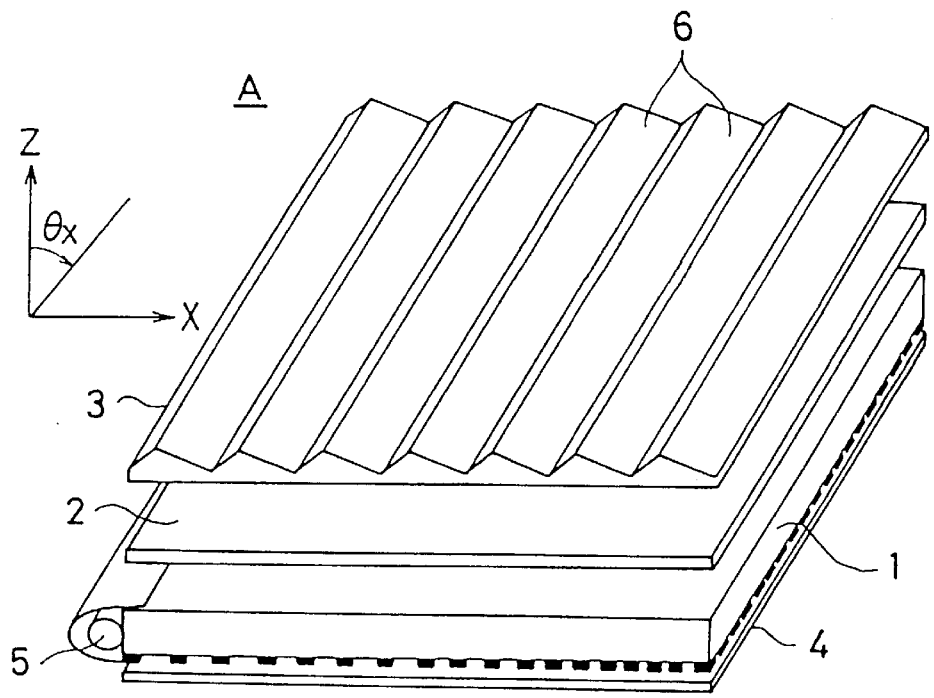
FIG. 1 is a perspective drawing of a surface light source covered with a conventional prism sheet.
Figure 2:
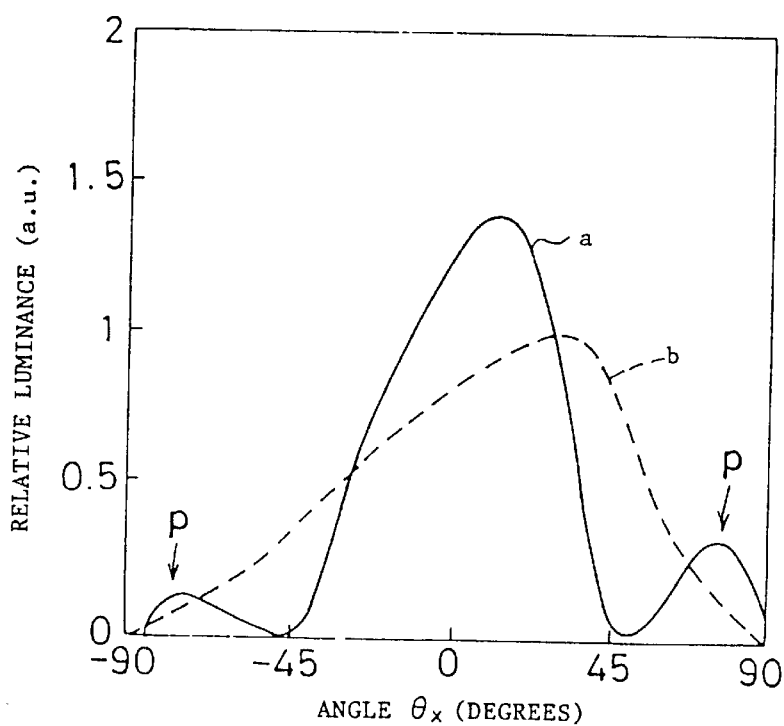
FIG. 2 is a graph of the angular distribution (the directional characteristic) of the luminance of the same surface light source.
Figure 3E:
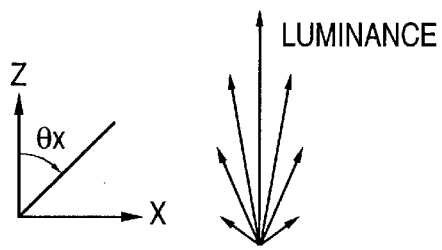
FIGS. 3 (a), 3 (b), 3(c), 3 (d), and 3 (e) illustrate the three modes of behavior (side mode, FIG. 3 (b); front mode, FIG. 3 (c); recurrent mode, FIG. 3 (d)) of light beams.
Figure 3B:
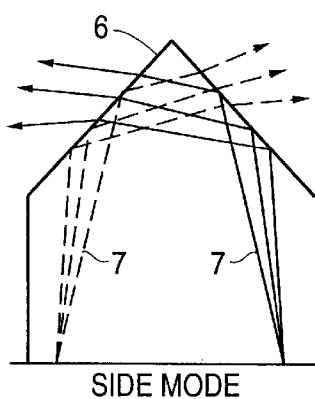
Figure 3C:
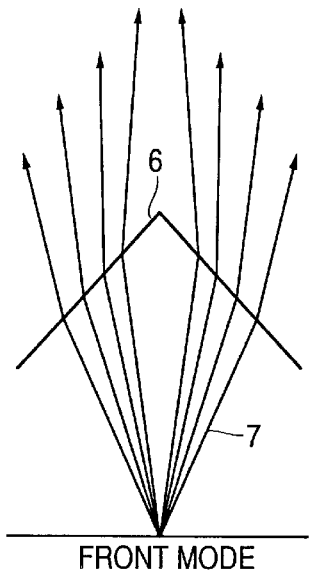
Figure 3D:
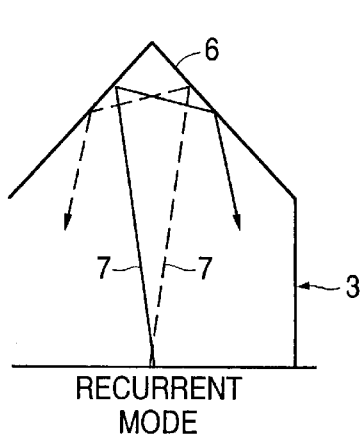
Figure 3A:
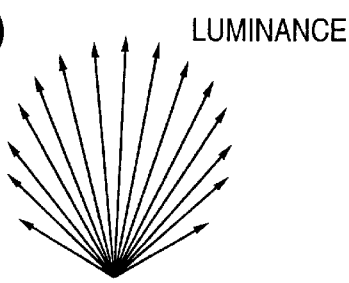
Figure 5:
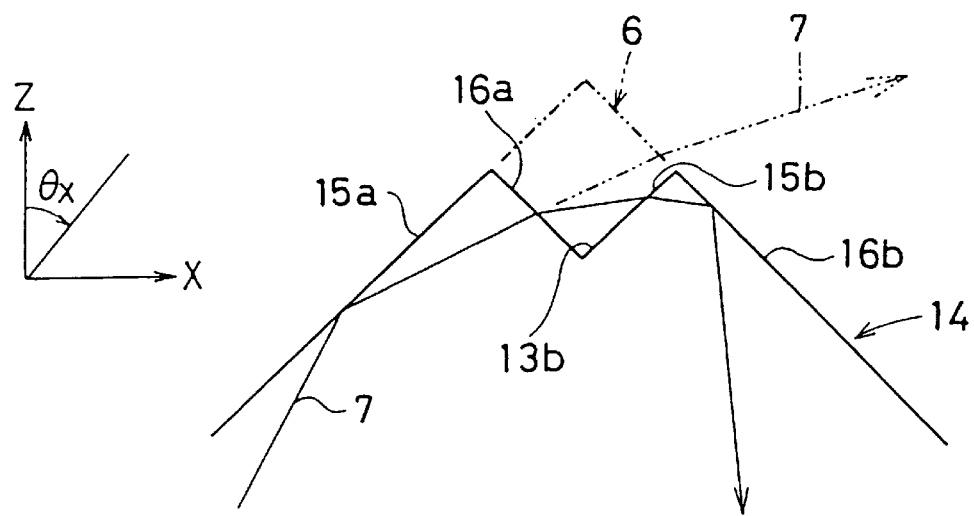
FIG. 5 illustrates the effect of the prism sheet in the same surface light source.

With this sort of pattern of repeated M-shapes, the light beams 7 which strike the prism sheet in the side mode and so are wasted in conventional light sources are converted to recurrent mode beams. The recurrent mode light is re-reflected and becomes front mode light, so the frontal luminance of surface light source B is increased. FIG. 5 illustrates the effect of a prism sheet 112 designed according to the invention. Basic unit 14 of prism sheet 112 and the path along which it conducts light beam 7 are drawn in solid lines. Prism 6 of conventional prism sheet 3 of FIG. 1 and the path along which it conducts light beam 7 are drawn in broken lines. With conventional prism 6, the beam of light reflected by surface 15a will strike the opposite surface, 16b, at an angle of incidence which is smaller than the angle of total internal reflection. As a result, it will be conducted to the exterior by surface 16b as side mode light. The basic unit 14 of the periodic pattern of the invention, however, has a shallow V-shaped groove 13b in its center. The light beam reflected by long surface 15a will exit from the next short surface 16a and enter minimal unit 14 via the opposite short surface 15b. When it passes through the two short surfaces, 16a and 15b, the light beam is refracted. The angle of incidence at the opposite long surface, 16b, thereby becomes larger than the angle of total internal reflection, so that light beam 7 is reflected downward by long surface 16b and assumes the recurrent mode. A prism sheet 112 with a periodic pattern as per the invention, then, will have increased frontal luminance, and the efficiency with which the light is used will be enhanced.

A comparison is made between the effects of the conventional prism sheet 3 and the prism sheet 112 according to the invention, with respect to each mode of light. To simplify the explanation, in FIGS. 6 through 8, the surfaces with positive slopes, 15a and 15b, have been made parallel with respect to each other, and the surfaces with negative slopes, 16a and 16b, have been made parallel with respect to each other.

Figure 6A:
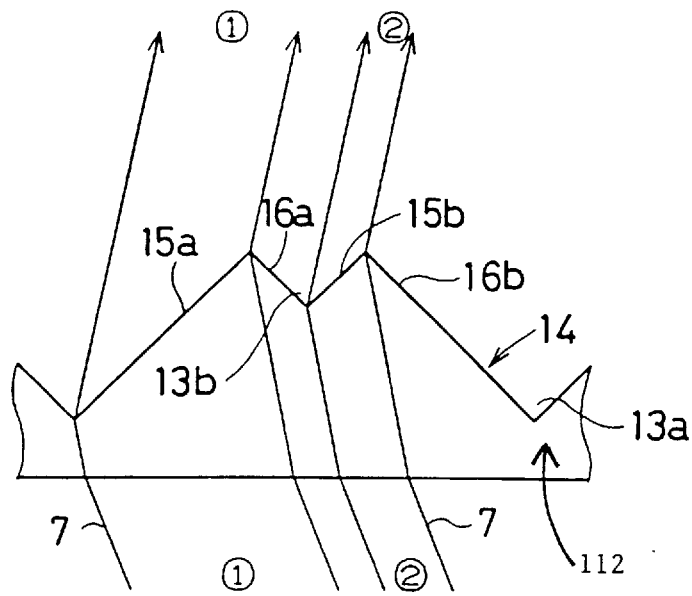
FIG. 6 (a) illustrates how front mode light behaves with respect to a prism sheet according to this invention.
Figure 6B:
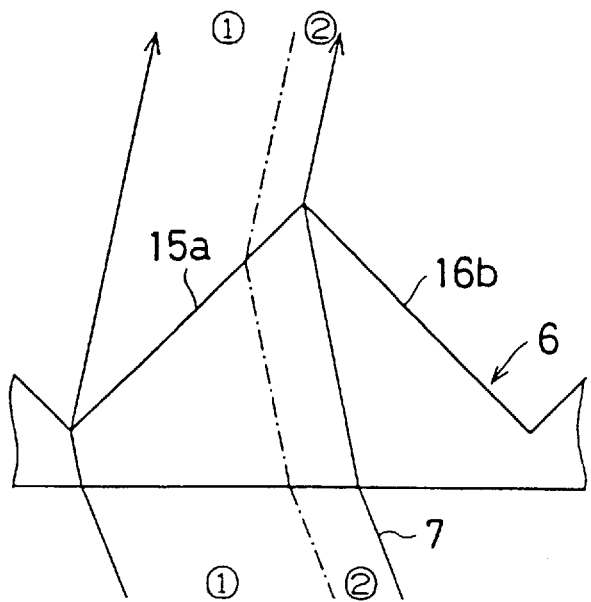

The behavior of light in the front mode which passes through positive-sloping surface 15a in the conventional prism sheet 3 is shown in FIG. 6 (b). The behavior of light in the front mode with respect to prism sheet 112 of the invention is shown in FIG. 6 (a). In the periodic pattern of the invention shown in FIG. 6 (a), all light beams 7 assume the front mode. In both FIGS. 6 (a) and 6 (b), the light in the front mode is transmitted along the same diffraction path, and the total quantity of light in front mode is identical. The circled numbers indicate the corresponding regions of the light beams.

Figure 7A:
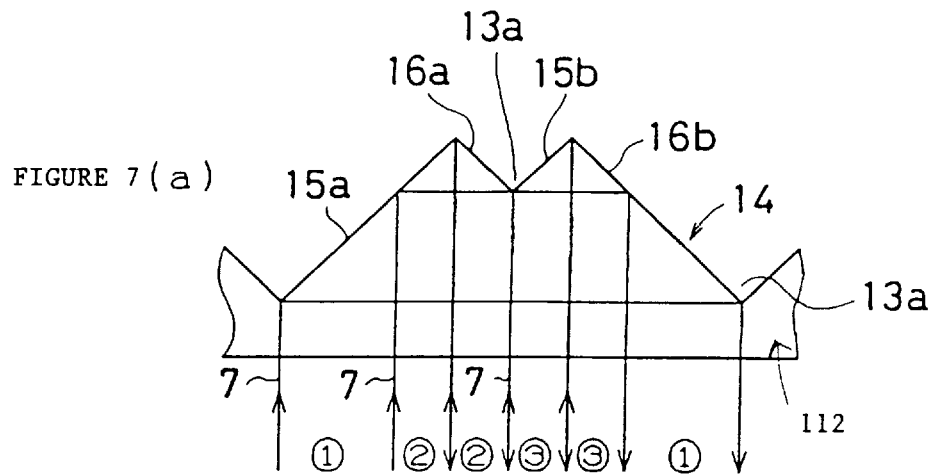
FIG. 7 (a) illustrates how recurrent mode light behaves with respect to a prism sheet according to this invention.
Figure 7B:
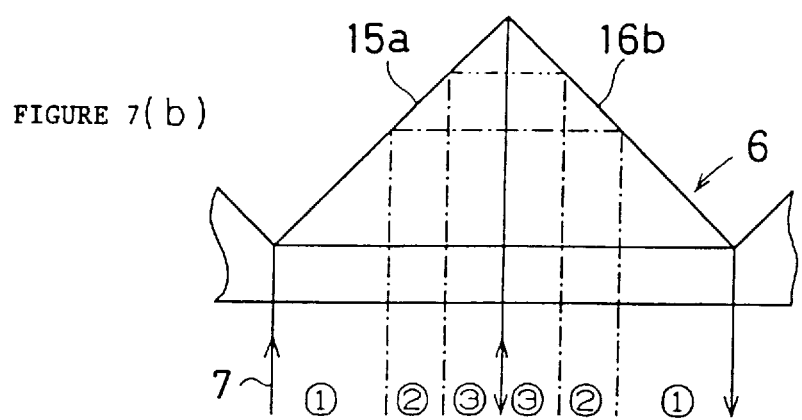

FIG. 7 (b) shows the behavior of light in the recurrent mode which is reflected by positive-sloping surface 15a in the conventional prism sheet 3. FIG. 7 (a) shows the behavior of the corresponding light beams 7 with respect to prism sheet 112 of the invention. With the periodic pattern of the invention shown in FIG. 7 (a), the light which strikes region (1) is returned to region (1); that which strikes region (2) is returned to region (2); and that which strikes region (3) is returned to region (3). Just as in the example from the conventional case, all the light assumes the recurrent mode. The quantity of light which recurs is the same in FIGS. 6 (a) and 6 (b), so the total quantity of light in the recurrent mode is the same.

Figure 8:
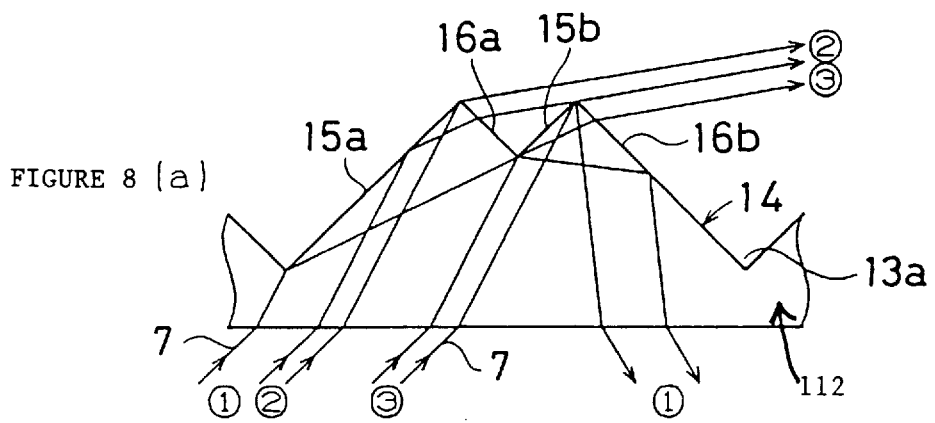
FIG. 8 (a) illustrates how side mode light behaves with respect to a prism sheet according to this invention.
Figure 8:
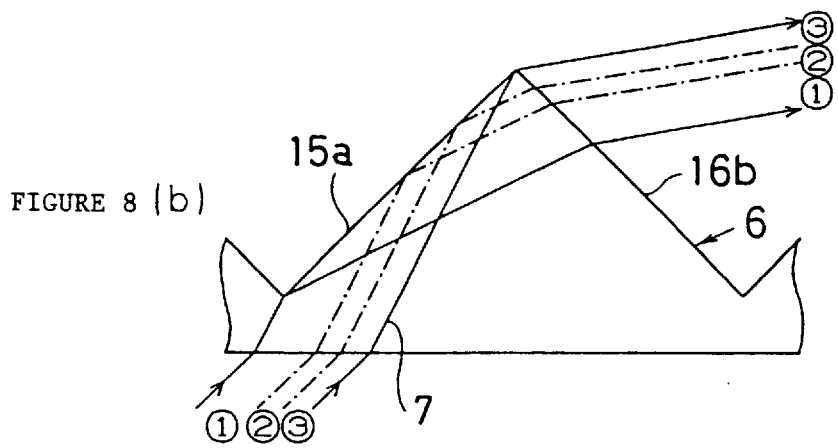

FIG. 8 (b) shows the behavior of light in the side mode which is reflected by positive-sloping surface 15a in the conventional prism sheet 3. FIG. 8 (a) shows the behavior of the corresponding light beams 7 with respect to prism sheet 112 of the invention. In the example of the conventional case shown in FIG. 8 (b), the beams 7 in regions (1), (2) and (3) all assume the side mode. With the prism sheet shown in FIG. 8 (a), the light in region (2) is reflected by long surface 15a and exits in the side mode from the opposite short surface, 16a. The light in region (3) is reflected by short surface 15b and exits in the side mode from the opposite long surface, 16b. The light in region (1), however, is reflected by positive-sloping long surface 15a, passes through short surfaces 16a and 15b, is reflected by long surface 16b and conducted downward in the recurrent mode.

When the prism sheet 112 of the invention is employed, then, the light beams which assumed the front or recurrent mode when they encountered the conventional prism sheet 3 assume those same modes, and a portion of the light beams which would be wasted in the side mode by a conventional prism are converted into the recurrent mode light. The prism sheet 112 of the invention reduces the quantity of light lost in the side mode and increases the quantity of light which assumes the recurrent mode. The result is that the quantity of light which assumes the front mode is increased.

When shallow V-shaped groove 13b is designed using the conventional prism sheet 3 as a starting point, a designer need not consider the light in the recurrent or front mode. Since his or her only problem is how to reduce the quantity of light in the side mode, the design process is simplified.

Figure 9:
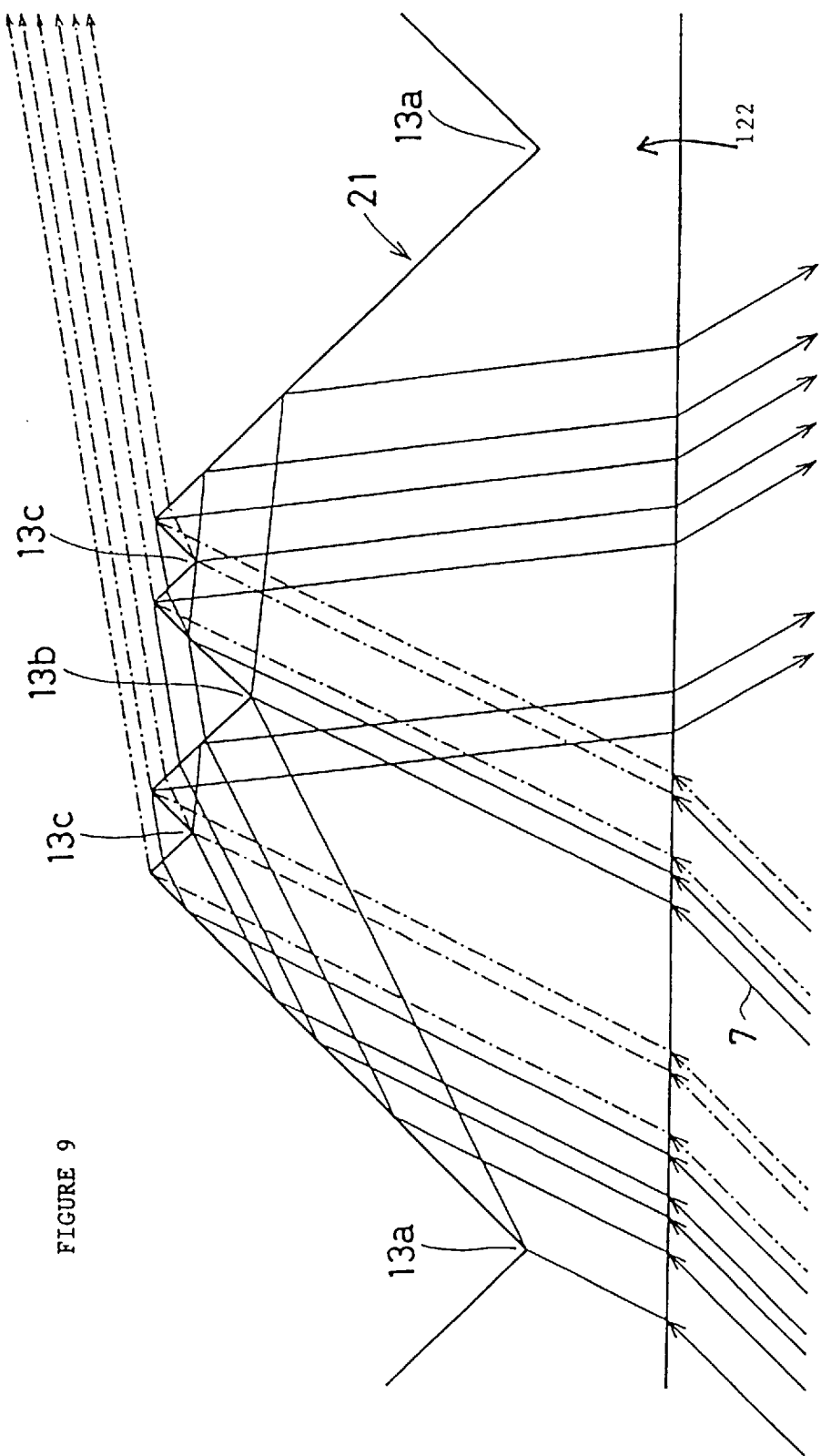
FIG. 9 shows a portion (the minimal unit) of a prism sheet which is another ideal embodiment of this invention.

FIG. 9 shows a portion (minimal unit 21) of the periodic pattern of prism sheet 122 of a second embodiment of this invention. The minimal unit of this periodic pattern has a deep V-shaped groove 13a on either end which separates it from the next minimal unit. Between these two deep grooves 13a is an intermediate groove 13b, which is separated from the deep grooves by two shallow grooves 13c. Thus, each minimal unit 21 has eight surfaces with positive and negative slopes arranged alternately.

Figure 10:
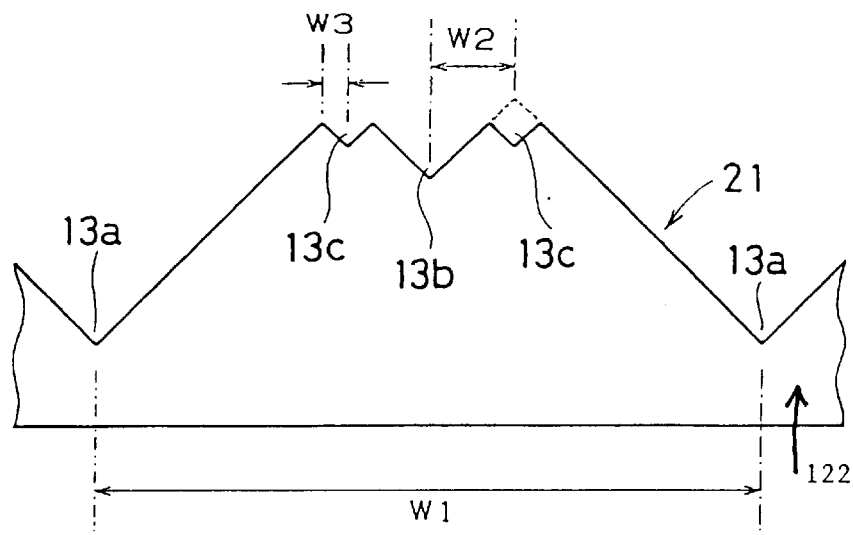
FIG. 10 illustrates the relationship between the dimensions of above prism sheet.

This configuration is equivalent to providing two additional shallow grooves 13c on the apices on either side of shallow groove 13b in the minimal unit 14 shown in FIG. 5 (intermediate groove 13b in FIG. 10). With this configuration, as can be seen in FIG. 10, the proportion of the side mode light which is converted to the recurrent mode can be increased.

If additional shallow grooves are created on the four apices of a minimal unit 21 produced in the way shown in FIG. 10, the proportion of the side mode light converted to the recurrent mode can be further increased. By repeating this process, one could continue endlessly to increase the number of grooves. However, increasing the number of grooves would result in an extremely detailed periodic pattern, which would make it difficult to manufacture prism sheet.

When the width of a minimal unit 21 in the periodic pattern approaches the period of a pixel in the liquid crystal display panel, a moiré will result. For this reason, the width $W_1$ normally chosen for a minimum unit is 30 $\mu$m, as shown in FIG. 10. If minimal unit 21 has only a single groove 13b, the width $W_2$ of one surface of that groove will be 5 $\mu$m. If unit 21 has three grooves, 13c, 13b and 13c, the width $W_3$ of one surface of a shallow groove 13c will be 1 $\mu$m. When a form is produced for prism sheet 122 in a cutting process, the edge portions of the pattern in the form take on a sub-micron roundness, which offsets the effect of increasing the number of grooves. When one compares the effective use of the light with the ease of producing the form, it seems most desirable to make a prism 112 whose minimal unit 14 has four surfaces and only one V-shaped groove, as shown in FIG. 6 (a).

Figure 11:
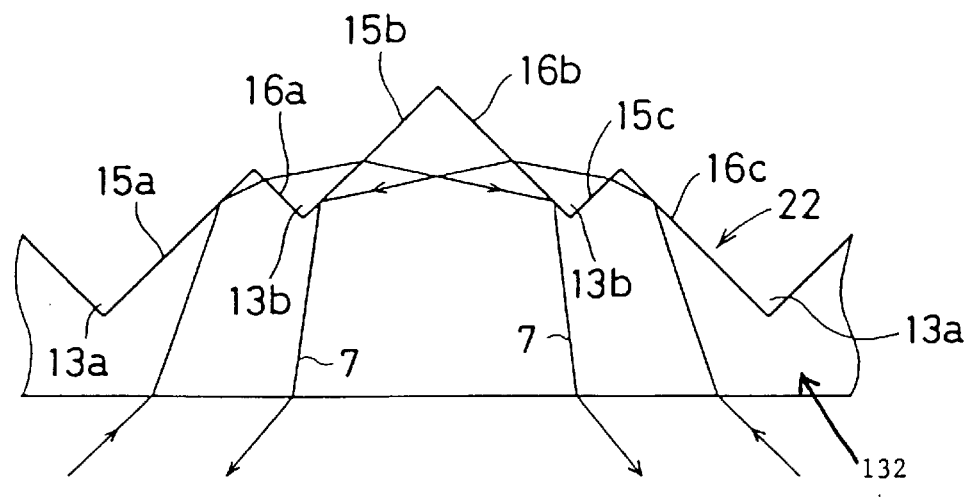
FIG. 11 shows a portion (the minimal unit) of a prism sheet which is another ideal embodiment of this invention.

FIG. 11 shows the minimal unit 22 in the periodic pattern of prism 132 according to a third embodiment of the invention. The minimal unit 22 of this periodic pattern has six positive- and negative-sloping surfaces, 15a, 15b, 15c, 16a, 16b and 16c, arranged alternately. The two central surfaces, 15b and 16b, are longer than the surfaces on their distal sides, 16a and 15c. The unit is symmetrical left to right. This minimal unit 22 can be achieved by forming a V-shaped groove 13b on either side of the apex in the center of a conventional prism 6, which has a triangular cross section. In the third embodiment, too, the design process can be simplified if the positive-sloping surfaces, 15a, 15b and 15c, are all made parallel to with respect each other, and the negative-sloping surfaces, 16a, 16b and 16c, are also made parallel with respect to each other.

In this prism 132, the minimal unit 22 is symmetrical left to right, so it can reduce the light in the side mode from the left and right sides equally. It has only two V-shaped grooves 13b, so its smallest surfaces, 16a and 15c, are not so short that it is impossible to produce a basic form for the prism sheet.

Figure 12:
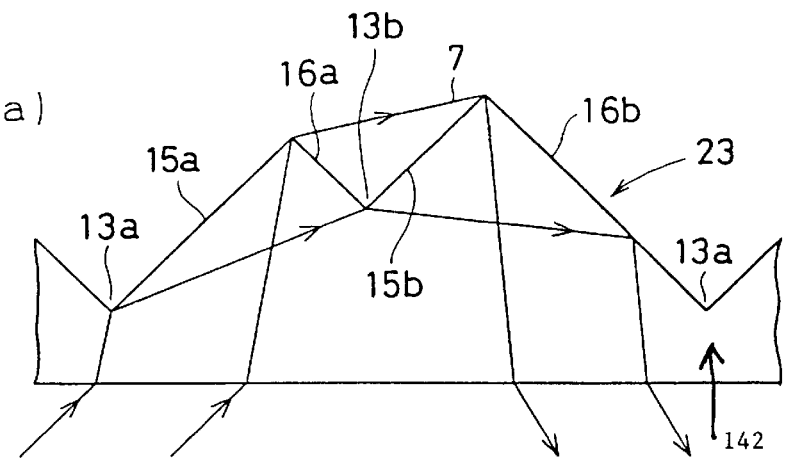
FIGS. 12 (a) and (b) illustrate the effect of a portion (the minimal unit) of a prism sheet which is another ideal embodiment of this invention.
Figure 12:
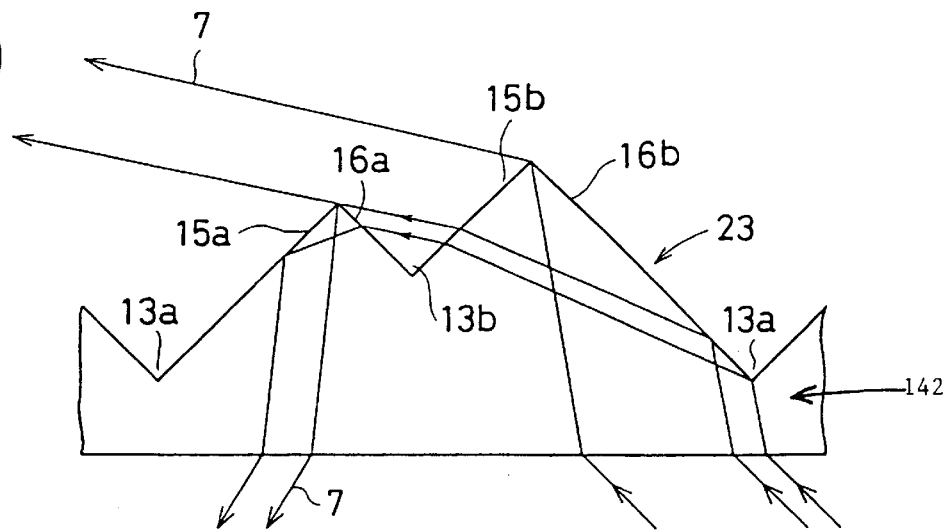

FIGS. 12 (a) and (b) show the minimal unit 23 in the period pattern of another prism 142 according to a fourth embodiment of the invention. The minimal unit 23 of this periodic pattern has four positive- and negative-sloping surfaces, 15a, 15b, 16a and 16b, arranged alternately. The distal surfaces, 15a and 16b, are of different lengths, as are the proximal surfaces, 15b and 16a. This minimal unit 23 can be achieved by forming on the apex of a conventional triangular prism 6 a V-shaped groove 15b which is biased to either the left or right.

As is shown in FIG. 12 (a), a prism 142 whose minimal unit 23 has a biased V-shaped groove 23 in its center will convert to the recurrent mode a high proportion of the side mode light which strikes the shorter side of groove 13b. As is shown in FIG. 12 (b), it will convert to the recurrent mode a much smaller proportion of the side mode light which strikes the longer side of the groove.

It is desirable, then, to shift groove 13b off center as in the third embodiment when there is significantly more side mode light striking one side of the prism. FIG. 15 (a) shows surface light source $C_1$, which has a backlight unit 11 with a light source 25 on one side to provide light radiating from the edge. When this sort of backlight 11 is used, the luminance is greatest in direction L, the direction faced by the side of the prism opposite light source 25. For this reason, the periodic pattern of prism 142 should have a minimal unit 23 oriented as shown in FIG. 15 (b). (This figure shows the shape of minimal unit 23 in a cross section taken along line k—k in FIG. 15 (a).)

Figure 13:
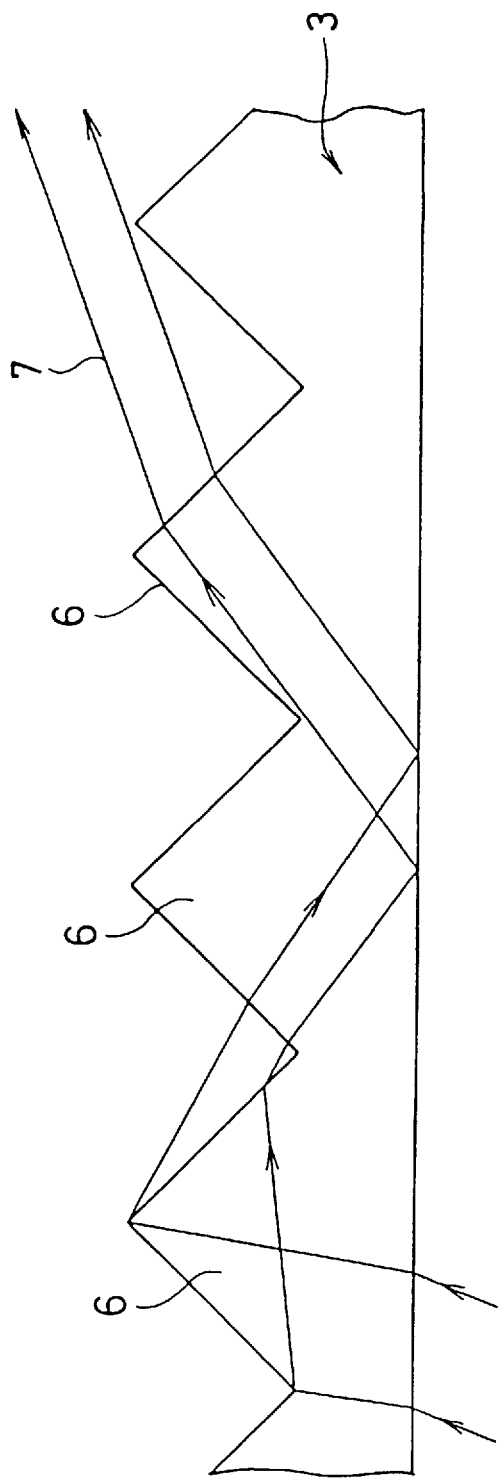
FIG. 13 illustrates the behavior of light in secondary side mode.

FIG. 13 illustrates the behavior of secondary side mode light. Depending on the shape and refractive index of the conventional prism 3, it will produce secondary side mode light which behaves differently from that shown in FIG. 3 (b). Secondary side mode is pictured in FIG. 13. A light beam 7 which enters prism 6 is reflected by one oblique surface of that prism and refracted by the opposite oblique surface. The beam exits to the exterior as primary side mode light but then strikes the next prism 6. It is totally reflected by the undersurface of prism 3 and exits the side of prism 6 virtually parallel to prism 3.

Figure 14:
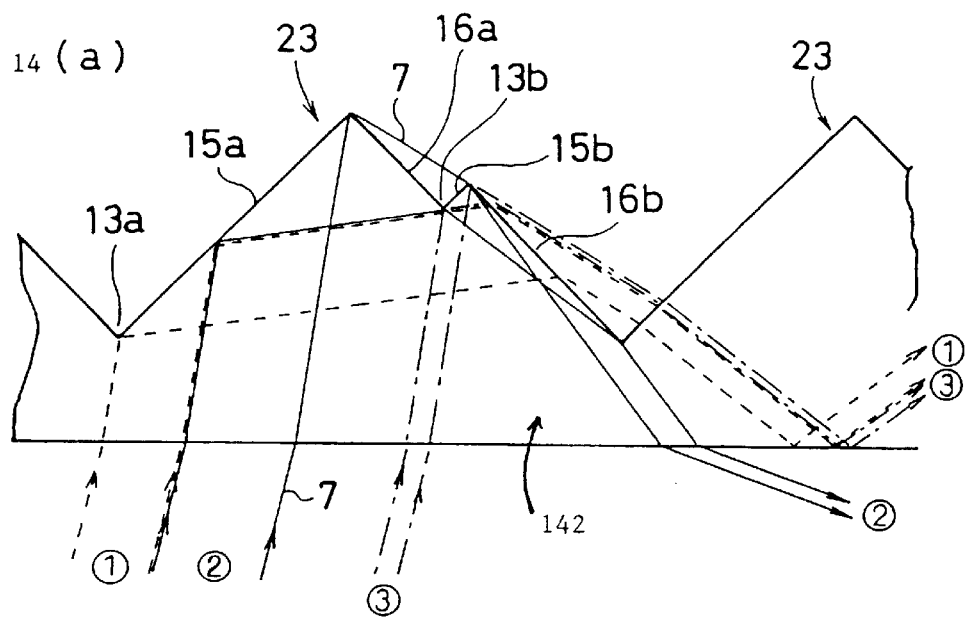
FIG. 14 (a) illustrates the configuration which converts a portion of the light in secondary side mode as described above to recurrent mode.
Figure 14:
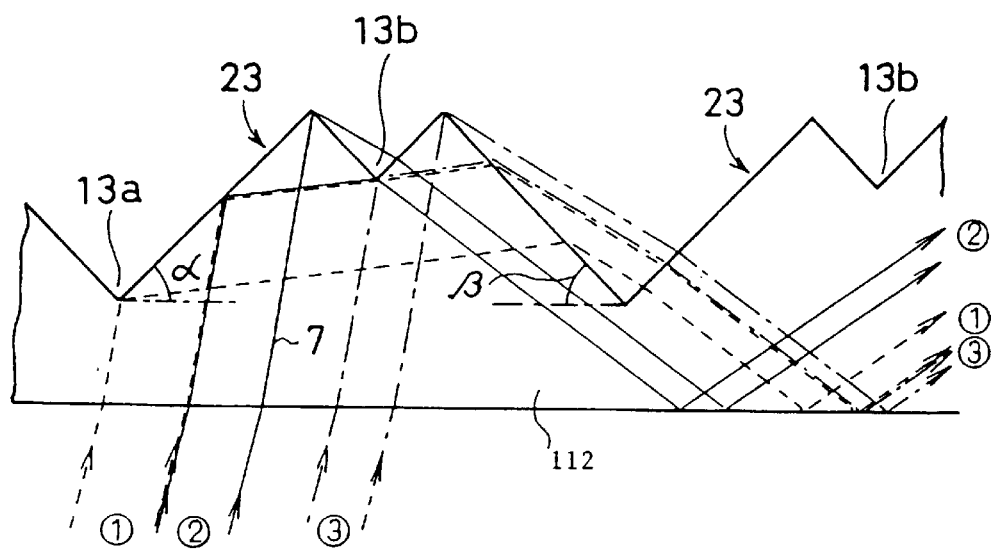

FIG. 14 (b) shows the behavior of this secondary side mode light with respect to a minimal unit 23 which is symmetrical left to right and has a shallow groove 13b in its center. All the light beams 7 which strike prism 112 in regions (1) through (3) are totally reflected by its undersurface and exit as secondary side mode light. A minimal unit 23 with this configuration, then, is incapable of converting secondary side mode light to the recurrent mode.

One can address this secondary side mode light by making a minimal unit 23 with a shallow groove 13b biased to either the left or right on the apex of a conventional triangular prism 6, just as in FIG. 12 (a). This will allow one to convert a portion of the secondary side mode light to the recurrent mode. As can be seen in FIG. 14 (a), the light beams 7 which strike the undersurface of prism 142 in regions (1) and (3) are totally reflected by the undersurface and assume the side mode, just as in FIG. 14 (b). The beams 7 which strike region (2), however, reenter prism 142 and exit to the exterior via the undersurface as recurrent mode light.

It is therefore desirable to offset groove 13b from the center of minimal unit 23, as in FIG. 14 (a), when there is a considerable quantity of secondary side mode light. The shallow groove 13b is oriented in opposite ways in FIGS. 12 (a) and 14 (a). In FIG. 12 (a), groove 13b is shifted so that it faces opposite the direction in which the side mode light is travelling when it exits the prism. In FIG. 14 (a), the groove is shifted to face the direction in which the secondary side mode light will exit the prism. In situations where there is both primary side mode light which does not strike the prism again and secondary side mode light which does, the user must ascertain which type of side mode light is more prevalent in order to determine in which direction groove 13b should be shifted. If one considers the secondary side mode light with respect to surface light source $C_1$ shown in FIG. 15 (a), there will be cases in which groove 13b should be shifted opposite to the way shown in FIG. 15 (b).

The angles $\alpha$ and $\beta$ which distal surfaces 15a and 16b make with respect to the lower surface of the prism (see FIG. 14 (b)) are related to the distribution of the luminance produced by the light source. These angles need not be identical (i.e., do not need to require $\alpha=\beta$), and appropriate values may be selected for them.

FIG. 16 (a) is a perspective drawing of surface light source $C_2$, according to a fifth embodiment of this invention. Light source $C_2$ has two backlight units 11, each with a light source 25, to provide edge lighting on two sides. Prism 142 has a periodic pattern consisting of asymmetrical minimal units 23 as shown in FIG. 12. The periodic pattern is uniform in the plane diagonal to conductive panel 24. Consider two cross sections which are both perpendicular to light sources 25 in prism 142. The cross section in FIG. 16 (b) (taken along line $n_1$—$n_1$ in FIG. 16 (a)) and that in FIG. 16 (c) (taken along line $n_2$—$n_2$ in the same figure) are each asymmetrical with respect to one of light sources 25. In this case, just as in FIG. 15, which way groove 13b should be biased will depend on the user's decision whether to address primary or secondary side mode light.

Figure 17:
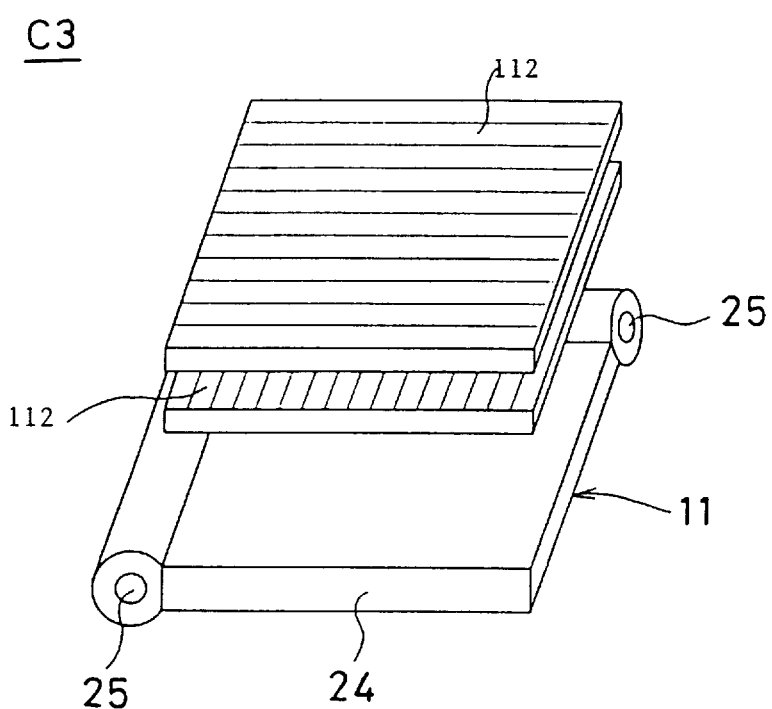
FIG. 17 is a perspective drawing of a surface light source covered with two prism sheets which is another ideal embodiment of this invention.
Figure 18B:
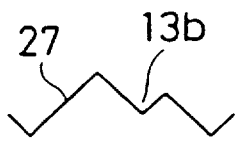
FIG. 18 (a) is a perspective drawing of a surface light source covered with a prism sheet which is another ideal embodiment of this invention.
Figure 18C:
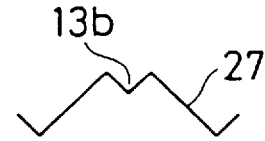
Figure 18D:
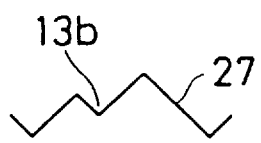
Figure 18A:
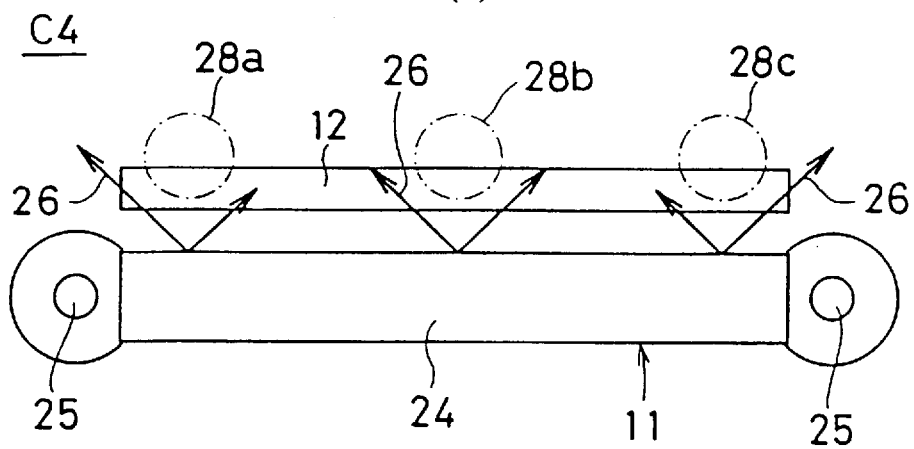

FIG. 17 is a perspective drawing of surface light source $C_3$, according to a sixth embodiment of the invention. Light source $C_3$ has two backlight units 11, each with a light source 25, to provide edge lighting on two sides, and two prism 112. One prism 112 has a periodic pattern which is uniform in parallel to one of the light sources. The other has a pattern which is uniform in parallel to the other light source. The minimal unit of the periodic pattern may be of any shape, so the user may select minimal unit 14 in FIG. 4, unit 21 in FIG. 10, unit 22 in FIG. 11 or unit 23 in FIG. 12.

When the angular distribution of the luminance of the light radiated by the conductive panel varies with the location, the characteristics of the minimal unit shown in FIG. 12 may be employed so that the cross section of the continuous pattern will vary with its location. FIG. 18 (a) shows surface light source $C_4$, which has a backlighting unit 11 with two light sources 25 on opposite sides of conductive panel 24 to provide edge lighting. In backlighting unit 11, as can be seen in the drawing, the luminance 26 in the vicinity of light sources 25 is greater on the paths which angle back toward the light sources than on the paths which angle away from them, and the angular distribution of the luminance 26 in the center of conductive panel 24 is symmetrical. In such a case, the V-shaped grooves 13b on the ends of prism 112 which are close to light sources 25 should be biased so that surface 27 faces away from the nearer light source. In the middle of prism 112 grooves 13b should be directly centered between two equal surfaces 27. As an alternative, the shape of the minimal units in prism 112 could be varied gradually from the extremities toward the center. FIGS. 18 (b), (c) and (d) show three such minimal units for prism 112. FIGS. 18 (b) and (d) are units which would be used in locations 28a and 28c; FIG. 18 (c) would be used in location 28b in FIG. 18 (a).

Figure 19:
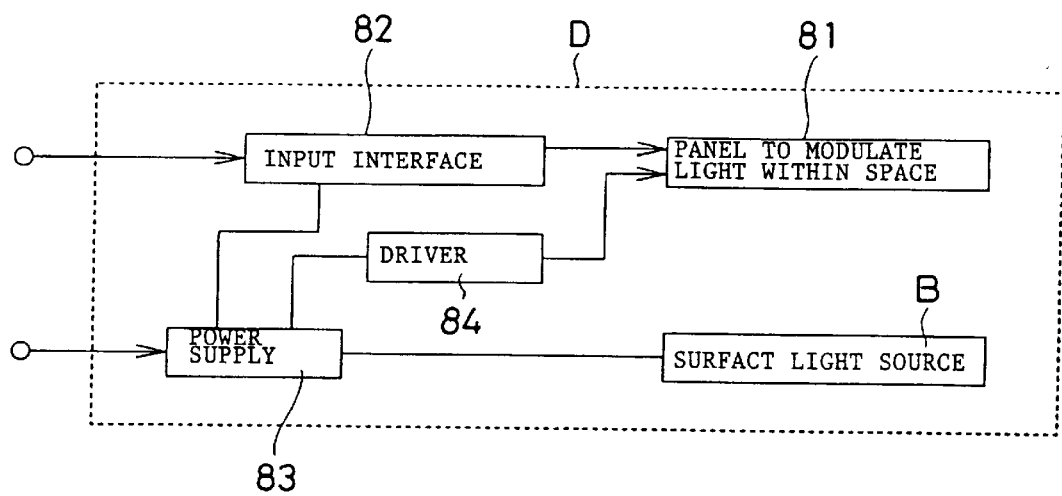
FIG. 19 is a block diagram of an image display incorporated with a prism sheet.

Surface light source B discussed above can be employed in a variety of image displays. FIG. 19 is a block diagram of image display D, a device which employs a surface light source B designed according to the invention. In response to an input signal, panel 81 converts the virtually uniform light emitted by surface light source B into a black and white or color image which it displays. Panel 81 may, for example, be a liquid crystal display panel. Input interface 82 converts the input signal to a signal which panel 81 can process. Power supply 83 supplies electrical power to driver 84 to drive surface light source B, input interface 82 and panel 81.

These image displays employing the surface light source are widely used in various types of image display devices, projection devices, head-mounting displays, non-portable and portable liquid crystal televisions (TV receivers), video cameras, and data terminals. Using a prism sheet designed according to this invention in any of these devices will result in higher surface luminance and improved legibility.

With the prism sheet according to the invention, a portion of the light which is emitted horizontally in the side mode and so wasted by a conventional art prism is converted to light of recurrent mode. Most of this recurrent mode light is then converted to front mode light. With the surface light source having the prism of the invention, then, the quantity of useless side-mode light is reduced and the quantity of front-mode light is increased. This allows us to achieve a surface light source with a high frontal luminance.

What is claimed is:

1. A surface-type prism sheet having a shape of a periodic pattern for use with a surface light source, each periodic pattern comprising:

a plurality of surfaces extending to one direction, wherein a cross section of said each periodic pattern has at least four surface slopes extending to an orthogonal direction with respect to adjacent surface slopes of said each periodic pattern, each of said at least four surface slopes faces opposite to said adjacent surface slopes of said each periodic pattern, wherein said at least four surface slopes of said each periodic pattern include two distal surfaces having first cross sectional widths and two proximal surfaces having second cross sectional widths different from said first cross sectional widths, and wherein said first cross sectional width is longer than said second cross sectional width.

2. A surface-type prism sheet according to claim 1, wherein said cross section of said each periodic pattern is configured by a plurality of positive and negative sloping surfaces in an alternating arrangement, said positive sloping surfaces being parallel to each other, and said negative sloping surfaces being parallel to each other.

3. A surface-type prism sheet according to claim 1, wherein said each periodic pattern of said prism sheet has six surfaces, two central surfaces of said six surfaces being of longer cross sectional widths than two intermediate surfaces of said six surfaces, said two intermediate surfaces being situated on distal sides of said two central surfaces, respectively, wherein two V-shaped grooves are formed in said each periodic pattern between respective ones of said intermediate surfaces and said central surfaces of said each periodic pattern.

4. A surface-type prism sheet according to claim 3, wherein each of said two V-shaped grooves in said each periodic pattern has a depth less than a depth at end portions of said each periodic pattern.

5. A surface-type prism sheet according to claim 1, wherein said surface slopes differ from place to place in such a way to counteract a variation of an incoming light emission in order to make uniform an intensity of outgoing light from said prism sheet.

6. A surface-type prism sheet according to claim 1, wherein said each periodic pattern of said prism sheet has eight surfaces, two central surfaces of said six surfaces being of longer cross sectional widths than two respectively adjacent first intermediate surfaces of said six surfaces, said each periodic pattern including second intermediate surfaces of said six surfaces respectively adjacent to said first intermediate surfaces of said six surfaces, said each of said periodic patterns including two distal surfaces respectively adjacent to said second intermediate surfaces of said six surfaces, wherein three V-shaped grooves are formed in said each periodic pattern, each of said three V-shaped grooves having a respective depth less than a depth of said each periodic pattern at respective beginning and ending points of said each periodic pattern.

7. A surface-type prism sheet according to claim 1, wherein a V-shaped groove is created in said each periodic pattern by said two proximal surfaces, said V-shaped groove having a groove depth less than a depth of said each periodic pattern defined at starting and ending points of said each periodic pattern that are respectively located at end points said distal surfaces of said each periodic pattern that are furthest away from said proximal surfaces of said each periodic pattern.

8. A surface-type prism sheet according to claim 1, wherein said at least four surface slopes extend along a substantially perpendicular direction with respect to said adjacent surface slopes of said each periodic pattern.

9. A surface-type prism sheet according to claim 1, wherein said first cross sectional widths of said two distal surfaces include a first and second cross sectional width different from each other, and wherein said second cross sectional widths of said two proximal surfaces include a first and second cross sectional width different from each other.

10. A surface-type prism sheet having a shape of a periodic pattern of prisms for use with a surface light source, said prism sheet having a substantially planar bottom surface and a top surface on which said periodic pattern of prisms are disposed, each of said prisms comprising:

a first point and a second point defining beginning and ending points of said each prism; and a V-shaped groove disposed in said each prism between said first point and said second point, wherein said V-shaped groove has a depth such that said first and second points are closer to said substantially planar surface of said prism sheet than any portion of said V-shaped groove.

* * * * *